Nov. 25, 1952.　　　　I. JEPSON ET AL　　　　2,619,578
CONVECTION HEATER
Filed April 22, 1948　　　　　　　　　　　　3 Sheets-Sheet 1
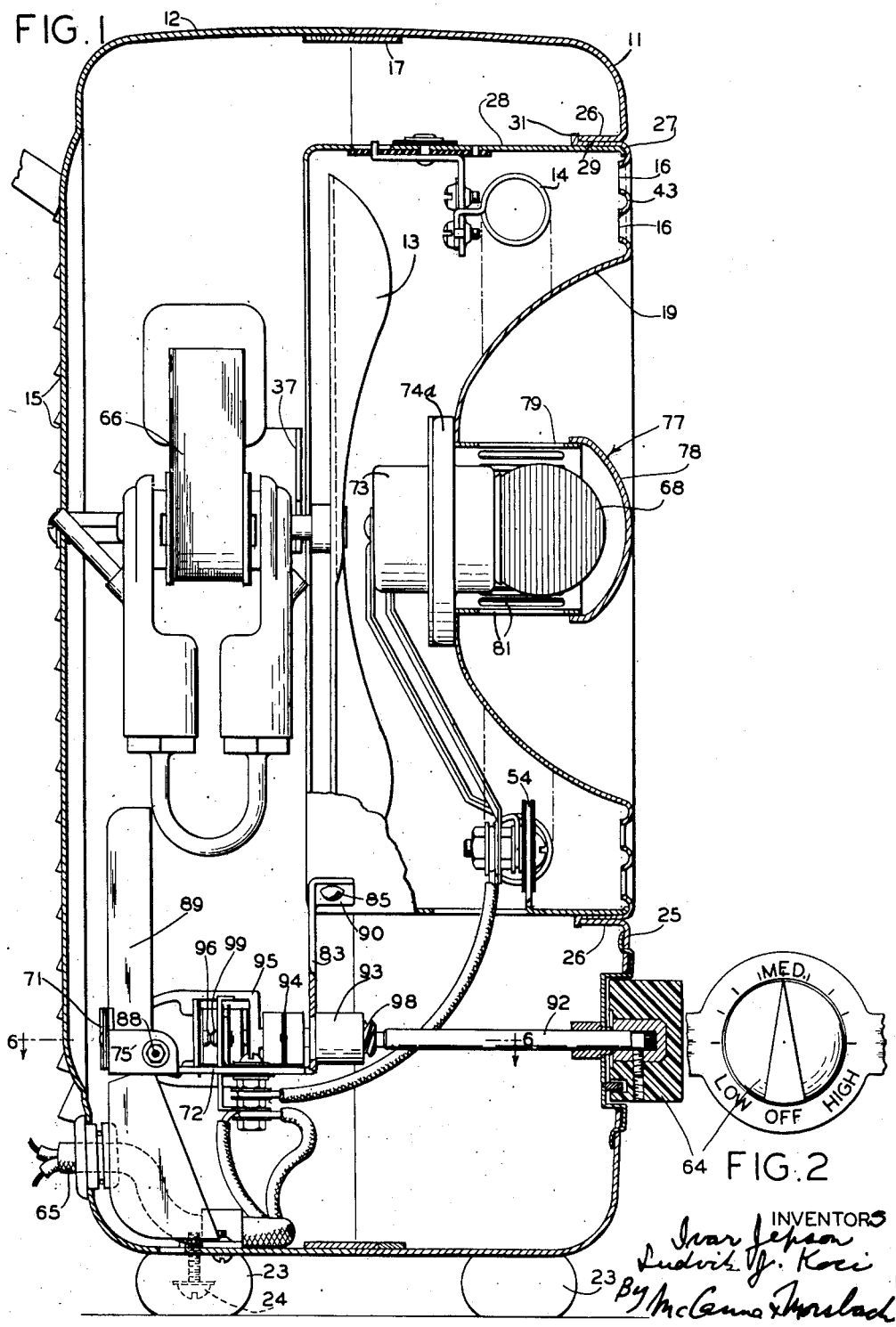
INVENTORS
Ivar Jepson
Ludvik J. Koci
By McCanna & Morsbach
ATTORNEYS.

Nov. 25, 1952  I. JEPSON ET AL  2,619,578
CONVECTION HEATER

Filed April 22, 1948  3 Sheets-Sheet 2

INVENTORS
Ivar Jepson
BY Ludwik Koci
McKenna & Nordlach
ATTORNEYS

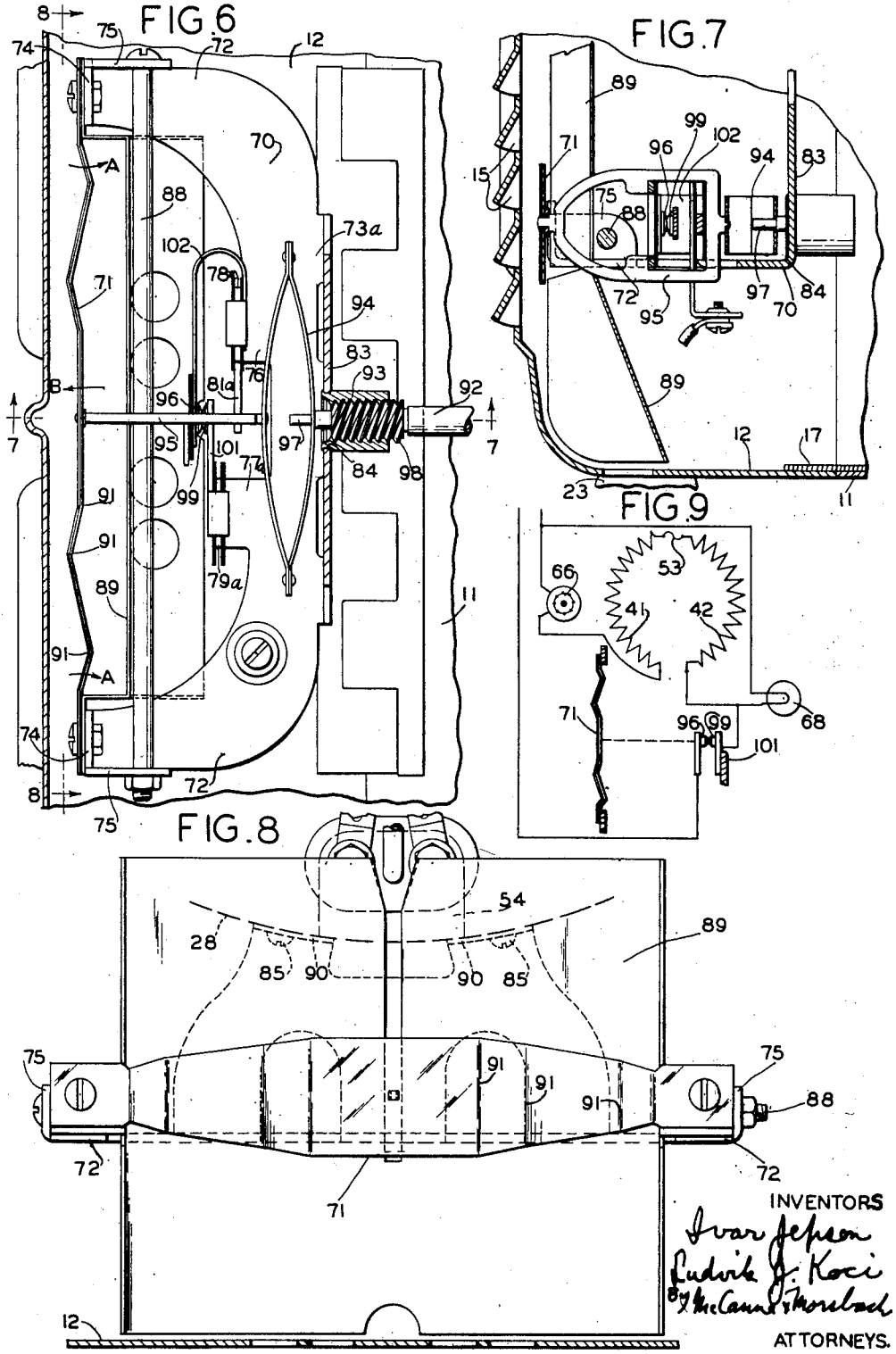

Patented Nov. 25, 1952

2,619,578

UNITED STATES PATENT OFFICE 2,619,578

CONVECTION HEATER

Ivar Jepson, Oak Park, and Ludvik J. Koci, Riverside, Ill., assignors to Sunbeam Corporation, Chicago, Ill., a corporation of Illinois Application April 22, 1948, Serial No. 22,664

9 Claims. (Cl. 219—39)

This invention relates to convection heaters having means for causing circulation of heated air. The invention has more particular reference to portable room heaters but is applicable in certain of its phases to convection heaters designed for other purposes. In the particular form disclosed herein, the invention constitutes a means of controlling the heat output of a portable room heater of the type which was the subject of Patent 2,372,832, granted April 3, 1945.

Portable room heaters of the type with which this invention is primarily concerned are of relatively small bulk so as to be easily moved about and so as to be capable of being stored when not in use in a relatively small space such as a closet or the like. By virtue of this small size it is apparent that where it is desired to control the operation of such a portable room heater automatically in response to the temperature of the room in which it is used that the means for controlling the same should be responsive solely to the air in the room. This can readily be accomplished by providing an associated thermal responsive device or the like for controlling the heater which is mounted in the room remote from the portable heater. Such an arrangement however will impair the portability since it will necessitate an extension cord relating the thermal responsive device such as a thermostat to the room heater. It is obviously desirable to have the thermostat or similar control means as an integral part of the portable heater itself.

The association of a thermostat with a portable heater of relatively small bulk presents some major problems by virtue of the fact that the thermostat must be mounted closely adjacent to the heating portions of the portable heater and yet should be responsive solely to the air in the room being heated. Obviously the mounting means for the thermostat will tend to cause it to be affected by the heating means associated therewith. Such a thermal responsive device should be capable of maintaining the room within plus or minus two degrees of a selected predetermined temperature whether the heat demand is 100% or zero. The heat demand depends upon the outside temperature as well as the heat loss factor of the room to be heated. When the heat losses from the room or heat demand exceeds 100%, i. e., exceeds the watts output of the heater, the thermostatic control becomes ineffective and the heater will be on continuously. As was mentioned above the thermal responsive device should be placed so that it is affected solely by the temperature of the room air and so that it is not affected by the temperature rise of the heater.

It has been found that no matter what precautions are taken when the thermostat is mounted within the confines of the portable unit heater that the temperature rise of the heater itself affects the thermostat device to such an extent that not only is the compensation for such temperature rise necessary, but such compensation must be applied in a manner quite different from most compensation problems. In such a portable unit heater the higher the demand on the heater the higher the temperature becomes and consequently the higher its effect on the themostatic device. It is found that with 100% heat demand on such a portable unit heater that the thermostat may rise in temperature as much as 6° F. If this temperature rise exceeds the limits of the air temperature which it is desired to control it will be apparent that an extraordinary type of compensation must be applied. It would be desirable therefore to provide a compact inexpensive automatic control device for a portable unit heater which is capable of controlling the air temperature over a range of a very few degrees F. which range is substantially less than the temperature variation of the thermostat control device due to its close association with the heater when the heat demand of the unit approaches 100%.

Accordingly it is an object of the present invention to provide a new and improved portable room heater including automatic temperature control means which is foolproof in operation and simple and compact in construction.

It is an object of the present invention to provide a convection type heater having a thermostatically controlled heating element which is responsive to the temperature of the inlet air to shut off the heater when the room temperature reaches a certain maximum and to restart it when the room temperature drops appreciably below that temperature, the thermostat being compensated in a special manner so that it will be non-responsive to temperature rise caused by heat transfer from the heating element and will be responsive for all practical purposes only to changes in the air inlet temperature and will be operative to maintain the room temperature within limits of two degrees on either side of a selected temperature, such limits previously having been considered impossible of attainment in an inexpensive, commercially practicable, portable space heater.

Broadly, it is the object of the present invention to provide a commercially practicable, portable, room air heater which operates in response to room air temperature and which is thermostatically compensated against temperature rise of the heater itself.

Another object of the present invention provides for controlling the temperature output of a convection type heater by means of a one-piece bi-metallic thermostatic strip positioned in the incoming air stream and mounted so that heat unavoidably transferred to the thermostat from the heater during normal running operations will heat the ends to a greater extent than the center thereof, the thermostat strip being so mounted that temperature change caused by heat transfer between the heating element and the thermostat causes its ends and center to be deflected the same amount in opposite directions, resulting in substantially no net movement of the thermostat center from its original position thereby in effect rendering the thermostat center non-responsive to heat transferred from the heater and responsive only to the temperature changes of room air drawn through the heater inlet.

Further objects and advantages of the present invention will become apparent as the following description proceeds, and the features of novelty which characterize the invention will be pointed out with particularity in the claims annexed to and forming a part of this specification.

For a better understanding of the invention, reference may be had to the accompanying drawings in which:

Fig. 1 is an enlarged vertical section through an electric heater embodying the invention;

Fig. 2 is a partial outside view of Fig. 1 showing a front view of the control knob;

Fig. 6 is a sectional view of Fig. 1 taken on the line 6—6;

Fig. 7 is a sectional view taken along the line 7—7 of Fig. 6;

Fig. 8 is a back view of the thermostat mechanism taken substantially along the line 8—8 of Fig. 6; and Fig. 9 is a diagrammatic view of the electrical circuits embodied in the portable heater of the present invention.

Figure 3:
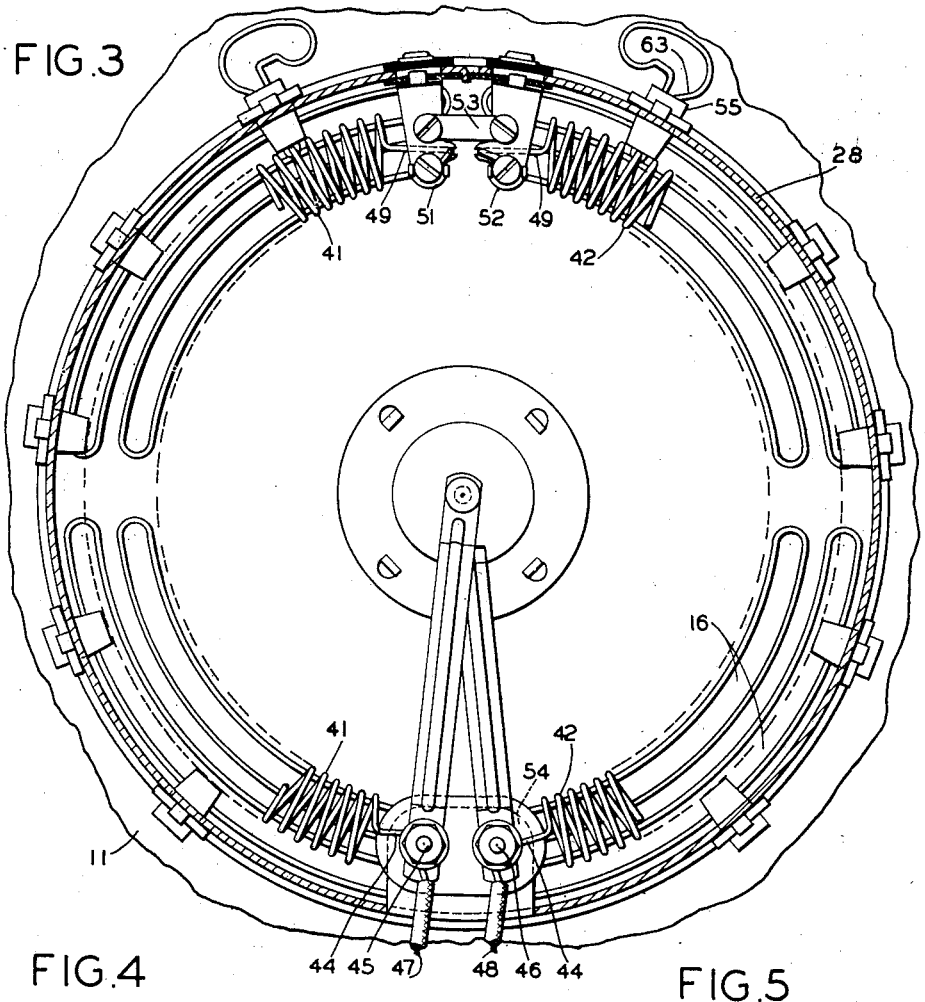
Fig. 3 is a fragmentary sectional view of Fig. 1.

In the embodiment shown in the drawings, an outer casing is provided consisting of a front casing member 11 and a rear casing member 12, within which is supported a motor-driven fan 13 and an electric heater 14 arranged so that the fan draws air through inlet louvers 15 in the rear casing member 12 and forces the air through the heater and out through a relatively narrow annular outlet in the form of arcuate openings 16 in the front casing member 11 for distribution in the room or space to be heated. The casing members 11 and 12, joined by strip 17 held together by screws (not shown), are separable to permit access to the motor and heater assemblies and other interior parts. In this embodiment it is preferred to support these assemblies on the front member in coaction with a glow reflector 19 and its associated parts as disclosed in Patent 2,372,832, issued April 3, 1945, so that by removal of the rear casing member these assemblies and associated parts are accessible. The casing may be supported by any suitable means, preferably for portability, as by rubber feet 23 connected to the casing members by screws 24. The front wall 25 of the front casing member 11 has an annular opening therein defined by an inwardly bent flange 26 on which is seated and supported an inner casing assembly which in turn supports the motor and heater assemblies above mentioned. The inner casing may be said to consist of a front member 27 in which the arcuate openings 16 and reflector 19 are formed, and a separate rear sleeve member 28 open at its opposite ends and defining the outer wall of an air conduit which leads to the outlet openings 16. This sleeve member also provides a support for the electric heater 14 and the motor-driven fan 13. The front inner casing member 27 has a rearwardly bent annular flange 29 which seats in the flange 26 and has an outwardly turned thrust shoulder 31 against which the flange 26 abuts. The sleeve member 28 seats at its forward end within the flange 29 and abuts against the inner front member 27. The casing members 11, 27 and 28 may be detachably clamped in this relation by a pair of draw bolts such as disclosed in the above-mentioned Patent 2,372,832, or in any other desired manner.

Figure 4:
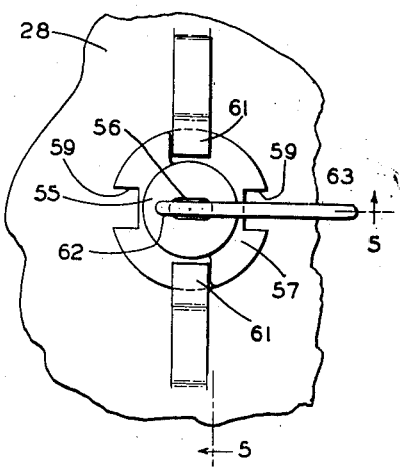
Fig. 4 is an outer face view of one of the construction mountings for the heater element.
Figure 5:
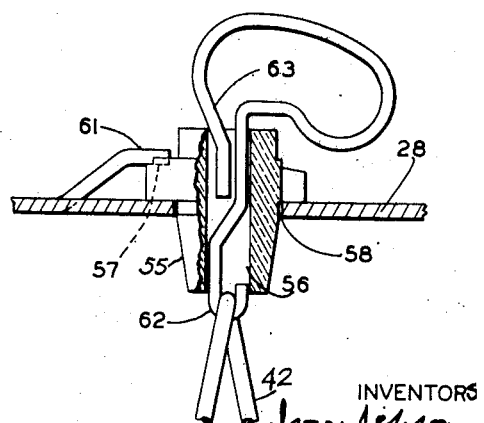
Fig. 5 is a section substantially on the section line 5—5 of Fig. 4.

The electric heater 14, best shown in Figs. 3, 4 and 5 consists of two elements 41 and 42 of suitable resistance wire preferably coiled and each supported in a semi-circular form so that together they make up an annular element conforming substantially with the diameter of the annular air outlet comprising the arcuate openings 16. As shown in Fig. 1, the heater 14 is located in the air conduit or channel defined by the sleeve member 28 and the reflector 19 for the purpose of heating the air forced through this conduit by the fan 13. The heated air is discharged from said conduit forwardly through the opening 16. These arcuate openings 16 which are defined by suitable guard members 43 are sufficiently narrow so as to afford protection against accidental access to the heater elements 41 and 42 from the front. The heater elements 41 and 42 each have ends 44 connected respectively to terminal posts 45 and 46 to which current supply leads 47 and 48 respectively are connected, and opposite ends 49 connected to the conductor bars 51 and 52 respectively which are interconnected by a fuse element 53 in keeping with the teachings of Browning Patent No. 2,015,251. The terminal posts 45 and 46 are mounted on a flat flange 54 in a manner so as to be insulated therefrom, which flange 54 is turned inward from the sleeve member 28, and the conductor bars 51 and 52 are insulatingly supported from the sleeve member 28 diametrically opposite from the terminal posts 45 and 46. Each coil element 41 and 42 is further supported from the sleeve member 28 through a plurality of individual insulation blocks 55. These insulation blocks 55 are arranged at spaced intervals along each coil element 41 and 42 so as to conform the coil to the desired arcuate shape and relation to the arcuate outlet openings 16. As shown in Figs. 4 and 5, each insulation block 55 has a cylindrical body portion provided with a through opening 56 and a projecting supporting flange 57. Each insulation block has one end inserted through one of a plurality of spaced openings 58 defined in the sleeve member 28 around the circumference thereof, from the outer side thereof, until limited by its flange 57 seating against the sleeve member 28. Each flange 57 is slotted as indicated at 59 to receiver retaining lugs 61 pressed outwardly from the sleeve member 28, so that when the insulation block 57 is seated it can be moved rotatively to disalign its slots 59 with respect to the retaining lugs 61, as shown in Fig. 4, to thereby engage the block 57 against displacement.

The coil elements 41 and 42 are supported at spaced points from the insulation blocks 55 by suitable wire support means 62 which include a hook portion for receiving the adjacent convolution of one of the coil elements and an enlarged loop portion 63. The support means and particularly the hook portion thereof is inserted through the opening 56 and the loop portion limits the extent of insertion. Preferably the opening 56 in each block 55 is elongated in cross section to prevent rotative displacement of the support means 62. The electric heater 14 is connected to a suitable electric energy source such as a supply circuit controlled by a switch having a manual control member 64 mounted within a recess defined within the outer casing and connected to a rotatable shaft 92 projecting through the front wall of the outer casing 11. The switch, described hereinafter, is connected to control the current flowing in the leads 47 and 48 which in turn are connected to a suitable supply cord 65.

The means for causing forced circulation of air through the heater may be of any suitable or desired construction. In the illustrated embodiment the motor driven fan 13 is drivingly connected to a motor unit designated generally as 66 attached to a bracket 37 at the rear thereof by screws (not shown) and carrying the fan 13 forward of the bracket 37. The motor unit 66 is preferably similar to that disclosed in Delmonte Patent No. 2,245,433 and is desirable because of its high efficiency and good lubrication features which make it particularly well adapted for economy and long life in an appliance of this kind.

The means for producing the glow effect in coaction with the discharge of the heated air will now be described. This includes the reflector 19, mentioned above, the front or concave face of which is treated or prepared to give it a fine, stippled effect to produce a uniform red glow by reflection of light rays from an illuminating means such as a lamp bulb 68 colored red. The lamp bulb 68 has the usual threaded end screwed into a suitable socket member 73 which has an outstanding flange 74a fixed to the reflector member by any suitable means. A removable guard and light shade 77 serves to protect the lamp bulb 68 and to baffle it from view and also to permit substantially unrestricted passage of its rays to the reflector face. This guard 77 comprises a substantially imperforate front cap 78 and a sleeve 79 having closely spaced elongated openings 81 entirely around the lamp so as to allow a full flow of the radiant rays from the lamp to the reflector face.

The electric circuit best shown in Fig. 9 of the drawings may be of any suitable arrangement such as, for example, as with the motor 66 and the heater 14 connected in series and the lamp 68 connected in parallel therewith as illustrated diagrammatically in Fig. 9, control being provided by the fuse 53 and the switch comprising contacts 96 and 99 which are controlled by the thermal responsive device including a thermostat or bimetallic element 71 and also the manual control knob 64. The fuse 53 prevents overheating from misuse or accidental use of the heater; for example, in the event the heater is covered or its inlet or its outlet openings are closed, or in the event the heater is turned on its front or back, obstructing the flow of air, or in the event of failure of the motor 66.

For the purpose of automatically controlling the operation of the unit heater to maintain a substantially constant temperature, there is provided a thermal responsive device comprising the bimetal or thermostat 71 which is mounted on a U-shaped (plan view, Fig. 6) bracket generally designated 70 having the arms 72 and bight 73a. The ends of the arms 72 are formed with the upstanding portions 74 and the sides of the arms 72 are formed with the upstanding portions 75. The rear of the bight 73a is formed with a pair of rearward extensions 76 and 77a having the upstanding ear portions 78a and 79a respectively, the portion 78a having a transverse tongue 81a. The front of the bight 73a is formed with the upstanding portion 83 apertured as at 84 and having a pair of transverse flanges 90 which are apertured and serve to hold the bracket in place by the screws 85 which are threadedly engaged with the bottom of the shell 28.

The thermostat 71, formed of a one-piece bimetal strip, has its ends rigidly mounted in a cantilever fashion upon the bracket arms 74. As may be seen by reference to Koci Patent 2,332,518, where this general type of thermostat was first disclosed, when the ends of the switch are mounted cantileverly and held firmly against both pivotal and longitudinal movement, a uniform temperature rise will cause the ends to be cantileverly deflected in the direction of the arrows A (Fig. 6), this being referred to as the "A" effect; and at the same time the intermediate portion will be bulged or deflected in the opposite direction indicated by the arrow B, this being referred to as the "B" effect. (By "uniform temperature rise," is meant an identical rise in temperature of all parts of the bimetal in response to the application of heat. This explanation is offered to eliminate the possibility of confusion with the condition of a temperature gradient along the length of the strip.)

The "A" and "B" effects are usefully combined, in a thermostat such as shown, to compensate for unavoidable non-uniform temperature rise of the thermostat due to conduction from the heater parts so as to render it responsive only to the temperature of the air entering through the inlet louvers 15. In practice, the condition of perfectly uniform temperature change in the strip 71 will seldom if ever be realized for there will always be a gradient between the ends and the center because the ends are in direct contact with the bracket arms 74 and the center is shielded against radiation from the heater elements by means of the reflector plate 89. In one experimental model of the modification illustrated, tests showed that the ends of the strip were heated four times as much as the center by this unavoidable heat conduction through the frame. That is, under full operating conditions the ends of the strip were found to reach an equilibrium temperature 24° higher than the air passing through it, while the center of the strip was only 6° higher. Furthermore, these temperature rises were found to be approximately proportional to the running time of the heater; for example, under half time running conditions, (on 50%, off 50% of the time) the ends and center temperatures were approximately 12° and 3°, respectively, above that of the incoming air. To construct the thermostat so as to be self-compensating under these conditions, the magnitude of the "A" and "B" effects must be approximately the same under actual running conditions where the ends of the strip will be heated considerably more than the center by conduction through the frame. In the particular test case just mentioned, this meant that the ends of the thermostat had to be weakened with respect to the center so that the "A" effect would be only one-fourth as great as the "B" effect at any given uniform temperature change; then, under actual operating conditions when the ends were heated four times as much as the center, the magnitude of the A and B effects were equal and opposite to make the thermostat non-responsive to temperature changes caused by conduction through the frame and to make it responsive only to the temperature of the inlet air passing over it. Fig. 8 illustrates one method which may be employed for weakening the ends of the thermostat with respect to the center. This may be done simply by tapering the ends off to a narrower width, as shown. Another modification might take the form of a strip of uniform width but having interior portions cut away near the ends to reduce the cross-section, and, therefore, the strength, at those points.

In practice, as where the thermostat is used to open and close an electric switch, it will preferably move from one position to another by snap action. This can be done by applying a longitudinal compressive stress to the strip. One means for doing this is illustrated by the through bolt 88 extending through the bracket arms 75 and which may be tightened or loosened to achieve the desired amount of compression.

The thermostat strip 71 is connected, by means of a connecting member 95, to one side of a resilient compressible member 94, which, in this instance, for the sake of a high degree of flexibility, comprises a pair of bowed leaf springs riveted together at their ends. The opposite side of the resilient member 94 has an aperture (not shown) formed therein which loosely engages an extension 97 of the threaded member 98 which is threadedly engaged within the bushing 93 mounted in the bracket opening 84. The threaded member 98 is mounted on the end of the shaft 92 which is rotatable by the control knob 64. A stationary contact 99 is mounted on a rigid member 101 which in turn is mounted on the bracket extension 77a, suitably insulated therefrom, and connected to one side of the electric circuit as shown in Fig. 9 of the drawings. The movable contact 96 is mounted upon the connecting member 95 and has a limited amount of lost motion with respect thereto so that the contacts may be opened and closed by snap action movement of the bi-metal 71. The movable contact 96 is connected through the flexible cable 102 to the hot side of the circuit. Counterclockwise rotation of the dial 64 to the "off" position will move the shaft 92 to its inward limit and apply a maximum compression to the resilient member 94. This compression will be of sufficient magnitude to overcome a certain forward bias provided in the bi-metal 71 during manufacture and will maintain the bi-metal in its rearward position to keep the contacts open. When the dial 64 is rotated clockwise from the "off" position to, say, the "med. (medium)" position which, for example, may call for a room or space temperature of 70°, the shaft 92 will be moved outwardly to the extent that the compression of the resilient member 94 will be released to allow the bi-metal 71 to snap the contacts closed and start the heater, providing, of course, that the room temperature is not already 70° or above, in which case the "B" effect in the strip due to the air temperature, plus the compressive force exerted by the resilient member 94, would hold the contacts open and the heater circuit would remain deenergized.

To prevent the contacts from chattering under low load it is desirable to snap them open and closed quickly. Therefore, snap action movement of the bi-metal between forward (Fig. 6) and rearward (not shown) positions is provided by stressing it in longitudinal compression. Stressing is done in this instance by applying tension to the bolt 88, which is provided to engage the bracket arms 75. The bolt 88 will preferably engage the bracket in such a position that in applying the longitudinal compression to the bi-metal strip 71 by warping the bracket legs 72 inward, the portions 74 of the strip will be moved little, if any, in an angular direction. Substantial angular movement of the ends of the bi-metal 71 would result in a change in its calibration adjustment. For a particular bracket design the exact position of engagement by the adjusting bolt 88 will be best determined by experiment. For example, referring to Fig. 6, where the bolt is shown attached to the bracket in the optimum position, if the bolt were mounted at a position substantially closer to the bi-metal 71, the bracket ends 72 would be twisted inwardly when tension is applied to the bolt and deflect the center of the bi-metal in a forward direction. Conversely, location of the bolt mounting at a distance substantially farther from the position shown in Fig. 6 would twist the bracket arms 72 outwardly when the bolt is tightened and deflect the center of the bi-metal 71 in a rearward direction. Either a forward or a rearward deflection of the center of the bi-metal 71 when the bolt 88 is tightened will disturb the calibration adjustment; the optimum position will be that where the adjusting bolt does not cause the bi-metal to be deflected substantially in either of those directions. Transverse crimps 91 will preferably be provided to impart longitudinal softness to the strip so that it may move easily between forward and rearward positions.

*Operation*

Considering now the operation of the presently disclosed improved heater, assume that the room or space to be heated is at 60° and it is desired to raise it to 70° which, in this case, we have already assumed coincides with the "med" (medium) setting of the dial. In manufacture, the bi-metal 71 will have been biased to an extent that it will tend to deflect forwardly to close the contacts. However, in the "off" position this bias will be overcome by the compression of the spring member 94 and the contacts will be kept open. When the dial is rotated clockwise to the "med" position under this room temperature condition, the compression of spring 94 will be reduced to the extent that the bi-metal bias will cause the latter to move forwardly through an axis of maximum compression from which it will snap forward further to close the contacts and energize the heater. Air will then be moved by the fan through the inlet louvers 15 across the heater element 14 and will be discharged through the annular outlet comprising the openings 16. The shield 89 of shiny material, such as stainless steel or aluminum, will provide a combined reflector and chimney action serving to shield the bi-metal from radiation from the heater coil 14 and at the same time providing a means for directing inlet air at relatively high velocity over the bi-metal 71 so it will be positively and quickly responsive to room air temperature.

As the heater runs, the bi-metal will be heated in two ways, first, unintentionally by a certain unavoidable amount of transfer from the heater coil 14 through the heater frame and bracket 70, and secondly, intentionally, by contact with the room air drawn through the chimney defined by the deflector 89 and the back wall of the casing portion 12. The first heat rise will be compensated for by the A and B effects in the bi-metal neutralizing one another as above explained so that the net movement of the center of the bi-metal due to conduction from the heater will be substantially nil. The bi-metal 71 will, therefore, be responsive only to the secondary rise induced by the temperature rise of the incoming air as the latter is heated. This will cause the center of the bi-metal to be deflected backward until it reaches an axis or position of maximum stress when the air temperature reaches the control setting temperature, in this case 70°. Thereafter, a slight further rise in temperature will cause the bi-metal to move rearwardly by snap action quickly to snap the contacts 96 and 99 open and deenergize the resistors 41 and 42 and the motor 66. When the air temperature then drops a degree or so as the room subsequently cools, the bi-metal 71 will deflect forwardly through its axis of maximum compression to reclose the contacts 96 and 99 by snap action. The temperature drop required to start the heater will be dependent to a certain extent on the longitudinal softness of the bi-metal resulting from the transverse crimps 91. That is, a high degree of softness imparted by a number of such crimps will permit the bi-metal 71 to move more freely through its axes of maximum stress to start and stop the heater.

While a particular form of the present invention has been shown it will be apparent that minor changes therein will readily suggest themselves to others skilled in the art without departing from the spirit and scope of the invention.

What is desired to be secured by Letters Patent of the United States is:

1. In a portable convection heater unit comprising a heating element and an electric control circuit therefor which unit is of such small size that a temperature responsive device supported thereon is affected substantially by variations in temperature of said unit, means for causing movement of the air past said heating element including air intake means through which substantially all the air moving past said heating element moves and air exhaust means, a temperature responsive device located in said air intake means for controlling the operation of said heating element, compensating means comprising a physical part of said temperature responsive device for causing said device to be substantially unaffected by the variations in temperature of any part of said unit and substantially responsive only to the temperature of the air flowing through said air intake means, and shielding means positioned in said air intake means between said heating element and said temperature responsive device to shield the latter from radiation from said heating means.

2. In a portable heating unit having a heating element and air intake and air exhaust means associated therewith, substantially all the air moving past said heating element passing through said air intake means, means including a thermostat located in said air intake operative to start and stop the heater in response to changes in temperature of the air in said intake, and compensating means for said thermostat to make the latter substantially independent of changes in temperature of said unit and responsive only to changes in temperature of the air in said intake, said unit having combined shielding and chimney means positioned in said air intake between said heating element and said thermostat to shield the latter from radiation from said heating element and to divert a portion of incoming air across said thermostat.

3. In a portable fan heater having a casing with electrically energized heating means disposed therein, means defining an air intake and an air exhaust in said casing, a thermostat comprising a bimetallic strip located in said air intake, a switch for controlling the energization of said heating means, said thermostat having its end portions cantileverly mounted within said casing and its center portion engaging said switch, the end portions of said strip being weakened with respect to the center portion thereof in a manner to render the strip non-responsive to heat conducted from said heating means through the casing, and means for shielding said strip from direct heat radiation from said heating means.

4. In a portable fan heater having electrically energized heating means and a thermostatic device located in the air intake of the heater, said device comprising a bimetal strip having its end portions supported in a centilever fashion so that said end portions are heated by conduction from said heating means to a greater extent than its center portion whereby changes in temperature of said strip cause said end portions to be deflected cantileverly in one direction and cause said center portion to be deflected in the opposite direction, said end portions being weakened with respect to said center portion to the extent that under normal running conditions when said end portions are heated to a temperature above said center portion by conduction from said heating means said opposite deflections due to conduction from said heating means will be equal in magnitude so that the net movement of said center portion due to said conducted heat is nil, switch means connected to the center portion of said strip for controlling the energization and deenergization of said heating means substantially in response only to temperature changes of air entering through said air intake.

5. A heater including a casing having inlet and outlet air openings, electrical heating means within said casing, an electric motor driven fan arranged to move air from said inlet to said outlet over said heating means, a thermostatic element comprising an elongated bimetal strip rigidly mounted at each of its ends within said casing, adjustable means for applying a longitudinal compressive stress to said thermostatic element, contact means controlling the electrical energization of said fan and heating means, said contact means being connected to a center portion of said thermostatic element to open and close said contact means at preselected temperatures of said inlet air, means for compensating said thermostatic element to render the center portion connected to the contact means non-responsive to temperature rise due to heat conducted from the electrical heating means but responsive only to temperature rise due to heat conducted from the air drawn through said inlet, and means for shielding said thermostatic element from direct heat radiation from said heating means.

6. A heater including a casing having inlet and outlet air openings, electrical heating means within said casing, an electric motor driven fan arranged to move air from said inlet to said outlet over said heating means, deflector means spaced from one of the walls of said casing to form an air conducting passage between said inlet and outlet, a thermostatic element comprising an elongated bimetal strip rigidly mounted at both ends within said passage, means including said deflector for shielding said thermostatic element from radiation from said heating means, contact means controlling the electrical energization of said fan and heating means, said contact means being operatively associated with said thermostatic element to open and close said contact means at preselected temperatures of said inlet air.

7. A heater including a casing having an air inlet and an air outlet, electrical heating means within said casing, an electric motor driven fan arranged to move air from said inlet to said outlet over said heating means, thermostatic means comprising an elongated bimetal strip cantileverly mounted at its end portions within said casing so that the center portion is movable in response to temperature changes of air drawn through said inlet, contact means controlling the electrical energization of said motor and heating means, said contact means being connected with said center portion of said strip, said strip being compensated with respect to temperature changes thereof caused by conduction through said casing whereby such temperature changes are ineffective to move the center of said strip, said strip being biased to tend to close said contact means, resilient means mounted to oppose the bias of said strip by stored energy therein, and manually adjustable means for storing energy in said resilient means to control the effectiveness of said bias to determine the air temperature at which said strip will be effective to open and close the contact means.

8. A heater including a casing having an air inlet and an air outlet, electrical heating means within said casing, an electric motor driven fan arranged to move air from said inlet to said outlet over said heating means, a thermostatic bimetal element comprising a substantially straight flat member rigidly mounted at its end portions upon a bracket disposed in said casing and having its end portions weakened to an extent determined by the distribution of temperatures in the bimetal resulting from heat conduction from said casing whereby the movement of an intermediate portion of said bimetal due only to said heat conduction will be substantially nil, contact means controlling the electrical energization of said motor and heating means, said contact means being movably connected with an intermediate portion of said bimetal and movable by said bimetal only in response to temperature changes of said inlet air to energize or deenergize said motor and heating means.

9. A heater comprising in combination, a casing, means defining an air inlet and an air outlet for said casing, electric heating means disposed in said casing, a motor driven fan in said casing for moving air from said inlet to said outlet over said heating means, a U-shaped bracket, supported in said casing adjacent said inlet, a longitudinally disposed bimetallic thermostatic strip having its ends cantileverly mounted upon the ends of said bracket with said thermostat disposed in said inlet so as to be responsive to the temperature of the air in said inlet, adjustable means associated with said bracket for applying a longitudinal compressive stress to said thermostatic strip, the end portions of said strip being weakened in resistance to deflection caused by temperature change with respect to the center portion to an extent that when a temperature change of said heating means is effective to change the temperature of said strip end portions to an extent greater than that of the center portion, whereby said strip end portions will deflect in one direction and the center portion will deflect a substantially equal amount in the opposite direction so that the center of said strip will not move in response to temperature changes thereof due to conductive heat transfer between said heating means and said strip and will move only in response to temperature changes of air entering said inlet, means for deflecting a portion of the air entering said inlet across said themostatic strip, said deflector means having a portion thereof made of heat reflecting material interposed between said thermostatic strip and said heating means to prevent the direct transfer of radiant heat therebetween, contact means for controlling the energization and deenergization of said motor and heating means, means connecting said contact means with the center portion of said strip in such a manner that a temperature rise of said strip induced by a temperature rise of incoming air urges said strip center portion to move in a direction to cause said contact means to deenergize said heater means and motor, and manually adjustable resilient means for resisting the movement of said strip in said deenergizing direction, whereby said manual means may be adjusted to preselect an incoming air temperature above which said heater will be inoperative to heat said air.

IVAR JEPSON.
LUDVIK J. KOCI.

REFERENCES CITED

The following references are of record in the file of this patent:

UNITED STATES PATENTS

| Number | Name | Date |
|---|---|---|
| 1,788,515 | Gannon | Jan. 13, 1931 |
| 2,139,921 | Weinhardt | Dec. 13, 1938 |
| 2,332,518 | Koci | Oct. 26, 1943 |
| 2,492,774 | Wild | Dec. 27, 1949 |

FOREIGN PATENTS

| Number | Country | Date |
|---|---|---|
| 483,039 | Great Britain | Apr. 6, 1938 |